(12) United States Patent
Johnson

(10) Patent No.: US 7,432,742 B2
(45) Date of Patent: Oct. 7, 2008

(54) SYSTEM AND METHOD FOR DETECTING AN EDGE OF A DATA SIGNAL

(75) Inventor: Tyler J. Johnson, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 802 days.

(21) Appl. No.: 10/805,979

(22) Filed: Mar. 22, 2004

(65) Prior Publication Data

US 2004/0225930 A1 Nov. 11, 2004

Related U.S. Application Data

(63) Continuation-in-part of application No. 10/635,083, filed on Aug. 6, 2003.

(60) Provisional application No. 60/469,180, filed on May 9, 2003.

(51) Int. Cl.
*H03K 5/22* (2006.01)
(52) U.S. Cl. .................................. 327/24; 377/118
(58) Field of Classification Search ................ 377/118, 377/119; 327/23–27
See application file for complete search history.

(56) References Cited

U.S. PATENT DOCUMENTS

| | | | |
|---|---|---|---|
| 3,571,728 A * | 3/1971 | Andrea et al. ................. | 377/48 |
| 4,300,100 A * | 11/1981 | Marchelli et al. ............. | 377/39 |
| 5,600,695 A * | 2/1997 | Negi ............................ | 377/51 |
| 5,650,885 A * | 7/1997 | Kitamura et al. ......... | 360/73.02 |
| 5,651,112 A | 7/1997 | Matsuno et al. | |
| 5,796,633 A | 8/1998 | Burgess et al. | |
| 5,835,702 A | 11/1998 | Levine et al. | |
| 5,881,223 A | 3/1999 | Agrawal et al. | |
| 6,112,317 A | 8/2000 | Berc et al. | |
| 6,112,318 A | 8/2000 | Jouppi et al. | |
| 6,360,337 B1 | 3/2002 | Zak et al. | |
| 6,369,627 B1 * | 4/2002 | Tomita ....................... | 327/158 |
| 6,546,359 B1 | 4/2003 | Week | |
| 2002/0178403 A1 | 11/2002 | Floyd et al. | |
| 2003/0033559 A1 | 2/2003 | Williams | |

* cited by examiner

*Primary Examiner*—Kenneth B. Wells
*Assistant Examiner*—William Hernandez

(57) ABSTRACT

A system and method for detecting an edge of a data signal carried on an observability bus. In one embodiment, a first performance counter is connected to receive the data signal in order to assert a trigger signal in response to detecting an assertion of the data signal. A second performance counter is connected to receive the data signal and the trigger signal. The second performance counter detects the edge responsive to detecting the assertion of the data signal and a logic level in the trigger signal that is a complement to a logic level associated with the assertion of the signal.

19 Claims, 4 Drawing Sheets

SYSTEM AND METHOD FOR DETECTING AN EDGE OF A DATA SIGNAL

PRIORITY UNDER 35 U.S.C. §119(e) & §120 AND 37 C.F.R. §1.78

This nonprovisional application claims priority based upon the following prior United States provisional patent application entitled: "GENERAL PURPOSE COUNTERS FOR PERFORMANCE, DEBUG AND COVERAGE," Application No.: 60/469,180, filed May 9, 2003, in the names of Richard W. Adkisson and Tyler J. Johnson; and this nonprovisional application is a continuation-in-part of the following co-pending United States nonprovisional patent application entitled: "GENERAL PURPOSE PERFORMANCE COUNTER," application Ser. No.: 10/635,083, filed on Aug. 6, 2003, in the names of Richard W. Adkisson and Tyler J. Johnson; both of which are hereby incorporated by reference in their entirety for all purposes.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). One or more specialized performance counters, or performance monitors, are connected to the CDP and are useful in collecting data from the CDP for use in debugging and assessing the performance of the system of which the CC is a part. Currently, each of the performance counters is capable of collecting data from only one preselected portion of the CDP, such that the combination of all of the performance counters together can collect all of the data on the CDP. While this arrangement is useful in some situations, many situations exist in which it would be advantageous for more than one of the performance counters to access data from the same portion of the CDP in order to perform debugging operations. In this respect, to facilitate debugging it would be advantageous to be able to detect both the rising edges and falling edges of the accessed data. These applications are not supported by the state-of-the-art performance counters.

SUMMARY

A system and method are disclosed that provide for detecting an edge of a data signal carried on an observability bus. In one embodiment, a first performance counter is connected to receive the data signal in order to assert a trigger signal in response to detecting an assertion of the data signal. A second performance counter is connected to receive the data signal and the trigger signal. The second performance counter detects the edge responsive to detecting the assertion of the data signal and a logic level in the trigger signal that is a complement to a logic level associated with the assertion of the signal.

DETAILED DESCRIPTION OF THE DRAWINGS

Figure 1A:
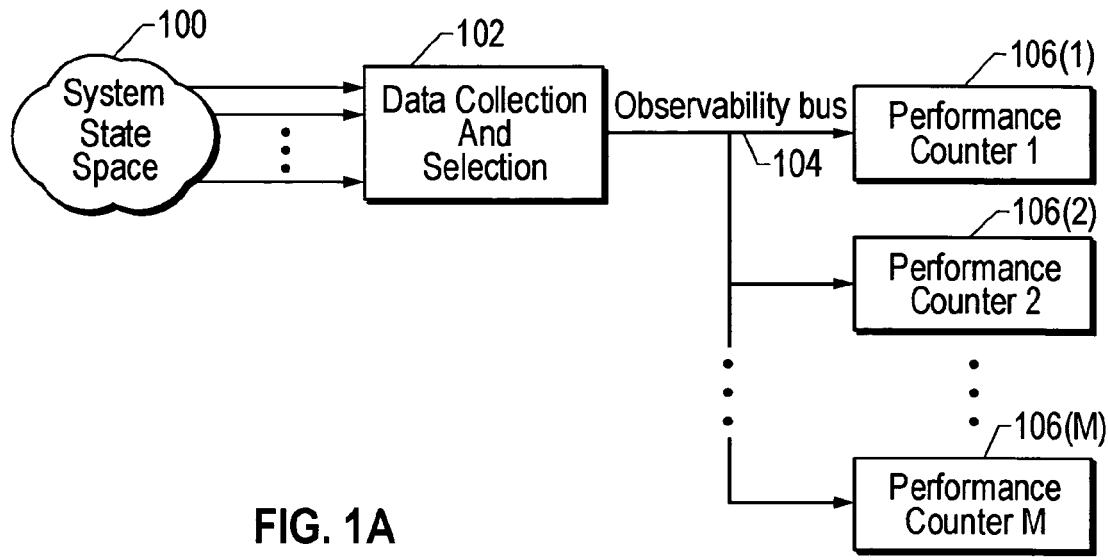
FIG. 1A depicts a block diagram illustrating general purpose data collection in a logic design.

In the drawings, like or similar elements are designated with identical reference numerals throughout the several views thereof, and the various elements depicted are not necessarily drawn to scale. FIG. 1A is a block diagram of general purpose data collection in a logic design. As shown in FIG. 1A, the state space 100 of a logic design under consideration is driven to data collection and selection logic 102. The logic 102 drives a D-bit data collection, or observability bus 104, carrying a D-bit debug_bus signal to a plurality of performance counters 106(1)-106(M).

In one embodiment, D is equal to 80, M is equal to 12, and performance counters 106(1)-106(M−1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 1B:
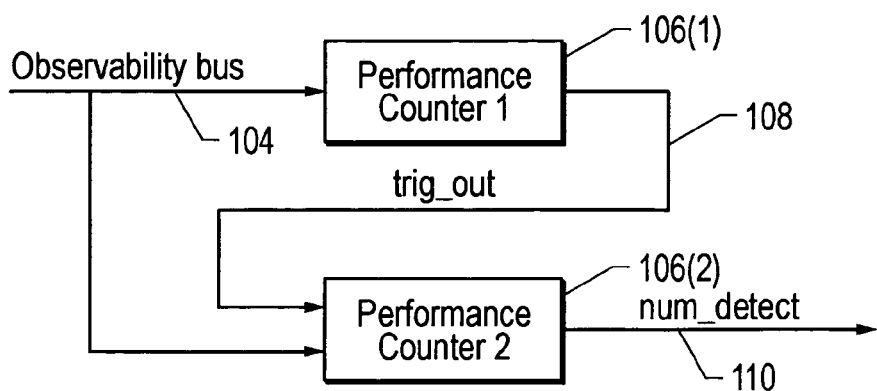
FIG. 1B depicts a block diagram of one embodiment of a system for detecting an edge of a data signal.

FIG. 1B depicts one embodiment of a system for detecting an edge of a data signal. The observability bus 104 provides the data signal to performance counter 106(1), i.e., a first performance counter, and performance counter 106(2), i.e., a second performance counter. The performance counter 106(1) asserts a trigger signal trig_out 108 in response to detecting an assertion of the data signal on the observability bus 104. As will be explained in more detail hereinbelow, in one implementation, the performance counter 106(1) may be set in either of two configurations depending on whether the data signal provided by the observability bus 104 is 1-bit wide Pr N-bit wide, wherein N>1. In one embodiment, the detected assertion of the data signal is an active high assertion or logic level 1 assertion. Further, in one embodiment, the trig_out signal 108 is functionally equivalent to the data signal delayed by one cycle.

The trig_out signal 108 is received by the performance counter 106(2) which detects the edge of the data signal by processing the data signal and trig_out signal 108. Specifically, responsive to detecting an assertion of the data signal and a logic level in the trig_out signal 108 that is a complement to a logic level associated with the assertion of the signal, the performance counter detects the edge and drives a num_detect signal 110 that indicates the detection of the edge and, in particular, the number of edges detected. By way of example, in one embodiment, the performance counter 106(2) may be configured to detect a rising edge. In this embodiment, upon detecting a logic high assertion of the data signal and a logic low level in the trig_out signal 108, the performance counter 106(2) detects a rising edge and drives the num_detect signal 110 accordingly. By way of another example, in another embodiment, the performance counter 106(2) may be configured to detect a falling edge by detecting a logic low assertion of the data signal and a logic high assertion in the trig_out signal 108.

Figure 2:
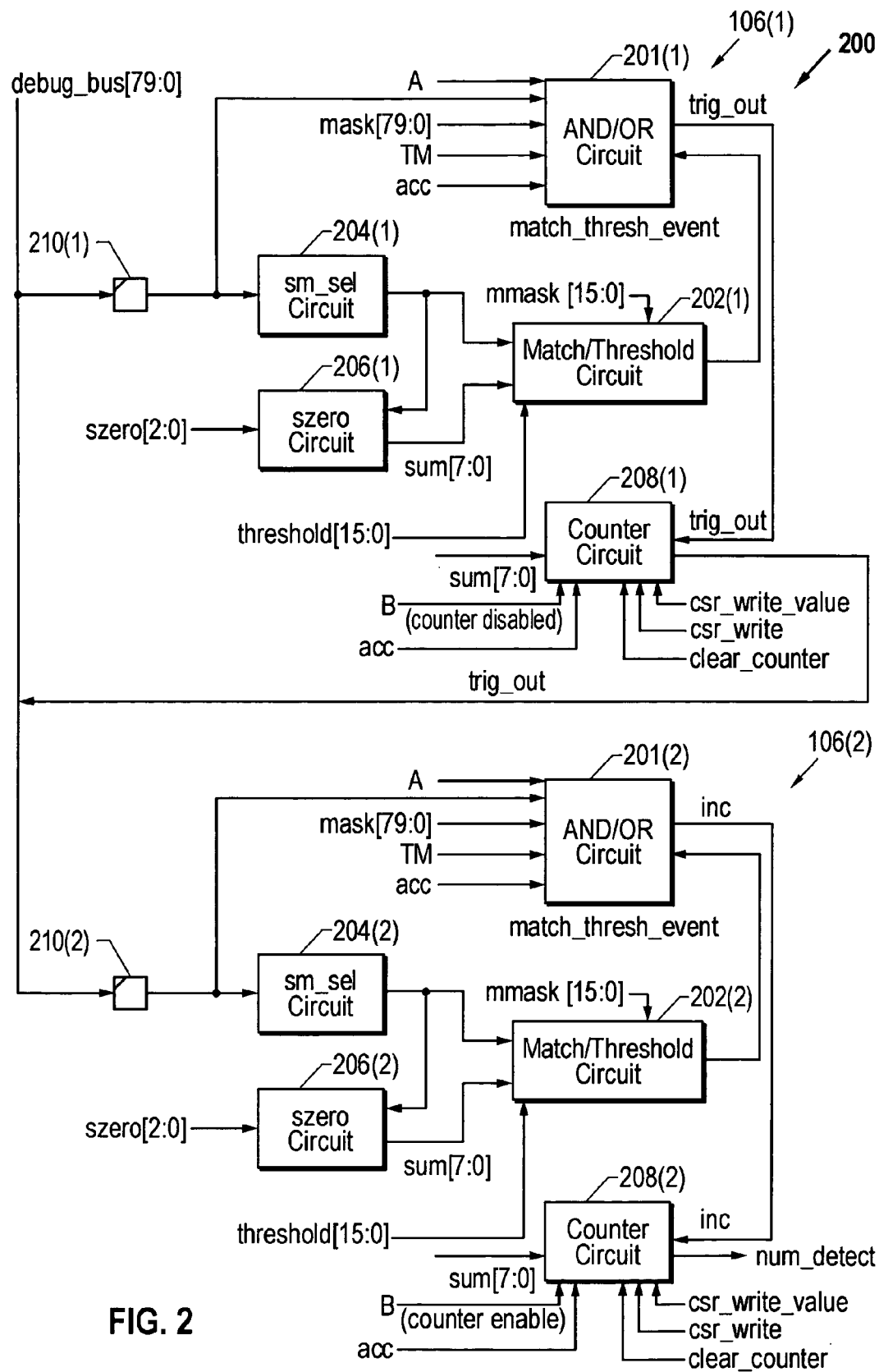
FIG. 2 depicts a more detailed functional block diagram of the system of performance counters illustrated in FIG. 1B.

FIG. 2 depicts the system 200 of performance counters shown in FIG. 1B in further detail. For purposes of illustration, since the general operation of performance counters 106(1) and 106(2) is similar, only the general operation of performance counter 106(1) will be described in detail. After the general operation of performance counter 106(1) is discussed, the interoperability of performance counters 106(1) and 106(2) relative to detecting rising and falling edges will be discussed in detail. The performance counter 106(1) can be used to perform general purpose operations to extract performance, debug, or coverage information with respect to any system under test (SUT) such as, for instance, the system state space 100 shown in FIG. 1. The performance counter 106(1) includes an AND/OR circuit 201(1), a match/threshold circuit 202(1), an sm_sel circuit 204(1), an szero circuit 206(1), and a counter circuit 208(1).

In general, the AND/OR circuit 201(1) enables access to any and all of the bits of the debug_bus signal coming into the performance counter 106(1) from the observability bus 104 via a register 210(1). In one embodiment, as illustrated in FIG. 2, debug_bus is an 80-bit signal. In addition to the debug_bus, the AND/OR circuit 201(1) receives an A signal, a TM signal, and an acc signal. When the AND/OR circuit 201 is operating in AND mode, the circuit activates a trig_out signal to the counter circuit 208(1) if all of the bits of the debug_bus signal plus two bits that are appended thereto that are of interest (as indicated by the value of an 80-bit "mask" plus two bits that are appended thereto) are set. It should be understood that with respect to performance counter 106(2), the trig_out signal is referred to as an inc signal. When the AND/OR circuit 201(1) is operating in OR mode, the circuit activates the inc signal to the counter circuit 208(1) if any one or more of the bits of the debug_bus signal plus the two additional bits that are of interest (as indicated by the value the mask plus the two additional bits) are set.

The match/threshold circuit 202(1) receives inputs from the sm_sel circuit 204(1) and szero circuit 206(1) in addition to a mmask [15:0] input. When the match/threshold circuit 202(1) is operating in "match" mode, a portion of the circuit activates a match_thresh_event signal to the AND/OR circuit 201(1) when an N-bit portion of the debug_bus signal selected as described in greater detail below with reference to the sm_sel circuit 204(1) and the szero circuit 206(1) matches an N-bit threshold for all bits selected by a match mask ("mmask"). In particular, for all bits of the selected N-bit debug bus signal portion that are "don't cares", the corresponding bit of mmask will be set to 0; conversely, for all bits of the selected N-bit debug bus signal portion that are not "don't cares", the corresponding bit of mmask will be set to 1. The match_thresh event signal is one of the two bits appended to the debug_bus signal. In the illustrated embodiment, N is equal to 16.

When the match/threshold circuit 202(1) is operating in "threshold" mode, a portion of the circuit 202(1) activates the match_thresh_event signal to the AND/OR circuit 201(1) when an S-bit portion of the debug_bus signal selected and zeroed as described in greater detail below with reference to the sm_sel circuit 204(1) and the szero circuit 206(1) is equal to or greater than the threshold. In the illustrated embodiment, S is equal to N/2, or 8.

The sm_sel circuit 204(1) selects an N-bit portion of the debug_bus signal aligned on a selected 10-bit block boundary into both the match portion and the threshold portion of the match/threshold circuit 202(1) and to a sum input of the counter circuit 208(1). As previously stated, in the illustrated embodiment, N is equal to 16. The szero circuit 206(1) zeroes out none or all but one of S bits aligned on a selected 10-bit block boundary into the threshold portion of the match/threshold circuit 202(1) and the sum input of the counter circuit 208(1). In the illustrated embodiment, S is equal to eight. The selected 10-bit block boundary is identified by the value of a three-bit control signal sm_sel input to the sm_sel circuit 204(1).

The operation of counter circuit 208(1) is enabled by setting an counter enable/disable signal B, which comprises one input of a two-input AND gate (not illustrated) associated with the counter circuit 208(1). The other input of the AND gate is connected to receive the trig_out signal from the AND/OR circuit 201(1). Accordingly, when the counter circuit 208(1) is enabled and the trig_out signal is activated, a logic one is output from the AND gate. In any other case, the output of the AND gate will be a logic zero. The output of the AND gate is replicated by an 8x replicator and the resulting 8-bit signal is bit-wise ANDed with an 8-bit signal output from a MUX circuit (not illustrated). The inputs to the MUX circuit are the sum[7:0] signal output from the szero circuit 206(1) and an 8-bit signal the value of which is [00000001]. The sum[7:0] signal will be output from the MUX circuit when the acc signal is activated; otherwise, the [00000001] signal will be output from the MUX circuit. It should be appreciated that performance counter 106(1) is configured to forward the trig_out signal to the performance counter 106(2) and not perform any counting operations (i.e., the counter control signal B is disabled) while the performance counter 106(2) is configured as described hereinabove.

In one embodiment, the performance counter 106(1) is 48 bits plus overflow that provides a general purpose counter in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Further details regarding the general operation of performance counters 106(1) and 106(2) as well as their internal circuitry may be found in the following prior United States provisional patent application entitled: "GENERAL PURPOSE COUNTERS FOR PERFORMANCE, DEBUG AND COVERAGE," Application No. 60/469,180, filed May 9, 2003, in the names of Richard W. Adkisson and Tyler J. Johnson; which is hereby incorporated by reference in its entirety for all purposes. Further relevant information is also available in the following co-pending United States nonprovisional patent application entitled: "GENERAL PURPOSE PERFORMANCE COUNTER," application Ser. No. 10/635,083, filed on Aug. 6, 2003, in the names of Richard W. Adkisson and Tyler J. Johnson; which is hereby incorporated by reference in its entirety for all purposes.

As previously discussed, the performance counter 106(1) has two modes of operation. Specifically, the performance counter 106(1) may be configured for 1-bit or N-bit operation, wherein N>1. In 1-bit operation mode, the AND/OR circuit 201(1) accesses 1 bit of data from the debug_bus via register 210(1). In this mode of operation, the AND/OR circuit 201(1) is operating in an AND mode wherein the AND/OR circuit 201(1) activates the trig_out signal in response to detecting an assertion in the debug_bus signal. In one embodiment the trig_out signal is activated in response to detecting an asserted active high state in the debug_bus signal. The trig_out signal is routed to the counter circuit 208(1), which drives the trig_out signal as the output of performance counter 106(1) to performance counter 106(2). As noted above, with respect to performance counter 106(1), the counter circuit 208(1) is not enabled to count, but rather passes the trig_out signal to the performance counter 106(2).

Alternatively, when the performance counter 106(1) is configured for the N-bit operation, the performance counter 106(1) routes the N-bit signal of the debug_bus from the sm_sel circuit 204(1) to the match/threshold circuit 202(1) wherein the match_thresh_event signal is asserted to the AND/OR circuit 201(1). In response to detecting an asserted active high state in debug_bus signal, the trig_out signal is asserted and driven to counter circuit 208(1), which in turn, forwards the trig_out signal to the performance counter 106 (2).

As previously mentioned, the performance counter 106(2) may be configured to detect either the rising edge or the falling edge of a data signal associated with the observability bus. As depicted in FIG. 2, the debug_bus signal and the trig_out signal are driven to a register 210(2). In one implementation, the trig_out signal arrives at the register 210(2) one cycle after the debug_bus signal and overrides a portion of the debug_bus signal. In the rising edge detection mode, the debug_bus signal is driven to the AND/OR circuit 201(2) and the trig_out signal is driven to the match/threshold circuit 202(2), which is set to match, and then to the AND/OR circuit wherein the trig_out signal is inverted and the debug_bus signal and trig_out signal are combined in such that the AND/OR circuit activates the inc signal in response to detecting an active high assertion in the debug_bus signal and an active low assertion in the trig_out signal. The inc signal is driven to the counter circuit 208(2) which counts the number of rising edges over a period of some cycles and asserts the num_detect signal that is indicative of the number of rising edges counted.

Alternatively, in the falling edge detection mode, the trig_out signal is driven to the AND/OR circuit 201(2) and the debug_bus signal is driven to the match/threshold circuit 202(2), which is set to match, and then to the AND/OR circuit wherein the trig_out signal and the debug_bus signal are combined such that AND/OR circuit activates the inc signal in response to detecting an active low assertion in the debug_bus signal and an active high assertion in the trig_out signal. Similar to the rising edge detection mode, the inc signal is driven to the counter circuit 208(2) which counts the number of falling edges and asserts the num_detect signal that is indicative of the number of falling edges counted. The num_detect signal may then be employed in debugging operations, for example. Accordingly, the system described herein provides for an economical approach to detecting rising and falling edges which can be further utilized in debugging operations. Further, by leveraging internal general performance counter circuitry to detect edges, the need for expensive external logic analyzer equipment is eliminated.

Figure 3:
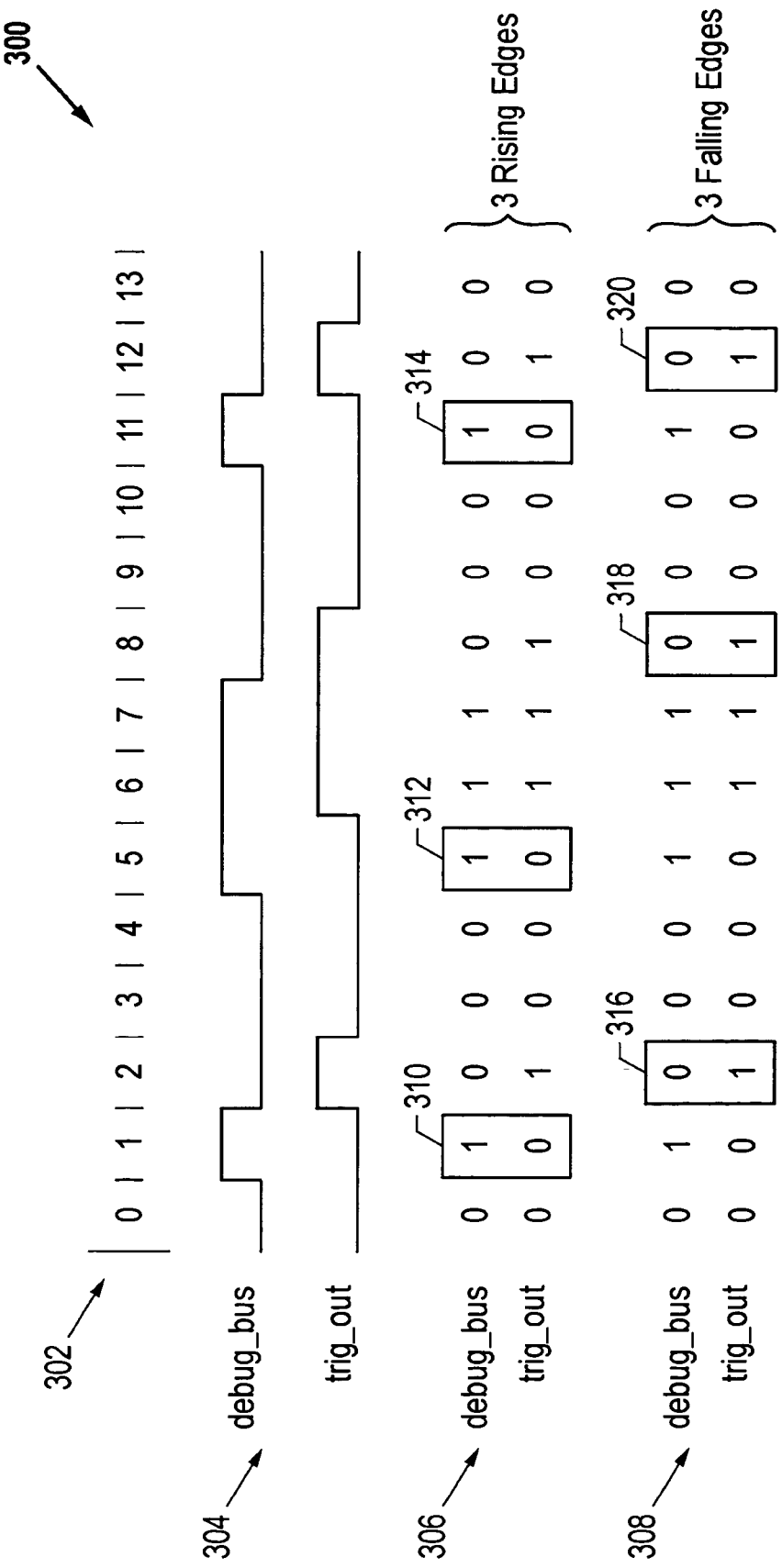
FIG. 3 depicts a timing diagram of the detection of rising edges and falling edges of a data signal in accordance with one embodiment.

FIG. 3 depicts a timing diagram 300 of the detection of rising edges and falling edges of a data signal in accordance with one embodiment. Free-running clock signal 302 specifies the cycle count and state changes of the observability bus 104 associated with the performance counters 106(1) and 106(2). Signals 304 comprise the debug_bus and trig_out signals as described above. Specifically, the debug_bus signal is the D-bit portion of the data signal carried by observability bus 104 and driven by data collection and selection logic 102 to performance counter 106(2). As previously discussed, the performance counter 106(1) drives the trig_out signal to performance counter 106(2).

The system for edge detection described herein may be configured to detect both rising edges and falling edges as depicted in rising edge detection scheme 306 and falling edge detection scheme 308, respectively. With regard to rising edge detection 306, the debug_bus signal and trig_out signal are sampled in terms of active high, i.e., 1, and active low, i.e., 0, assertions. For example, at cycle 7, the debug_bus signal is 1 and the trig_out signal is 1 since both signals are logic high at cycle 7. In operation, the performance counter 106(2) detects a rising edge on the debug_bus by determining or detecting an active high assertion on the debug_bus signal and the logic complement of the asserted active high state in the trig_out signal; namely, an asserted active low state on the trig_out. That is, a rising edge in the data signal is detected when the sampled data signal is a logic high whereas the sampled trig_out signal is a logic low. As depicted, the performance counter 106(2) detects or samples an active high state in the debug_bus signal and the complementary active low assertion in the trig_out signal at cycles 1, 5, and 11 as represented by reference numerals 310, 312, and 314, respectively. Hence, for cycles 0-13 of the debug_bus signal, three rising edges are detected.

With regard to the falling edge detection scheme 308, the performance counter 106(2) detects a falling edge on the debug_bus by sampling an active low state on the debug_bus signal and the logic complement of the active low state in the trig_out signal, i.e., an asserted active high state on the trig_out signal. As depicted, the performance counter 106(2) detects an active low state in the debug_bus signal and the complementary active high state in the trig_out signal at cycles 2, 8, and 12 as represented by reference numerals 316, 318, and 320, respectively. Accordingly, for cycles 0-13 of the debug_bus signal, three falling edges are detected. The number of detected rising edges or the number of detected falling edges may be provided to a third performance counter or other digital circuit element to facilitate further analysis and, in particular, debugging operations. For example, the number of edges may be utilized to calculate the duty cycle or percentage of time that the debug_bus signal is at a high or low asserted level. By way of another example, the number of edges may be utilized with data relative to the number of asserted cycles to determine the average pulse width.

Figure 4:
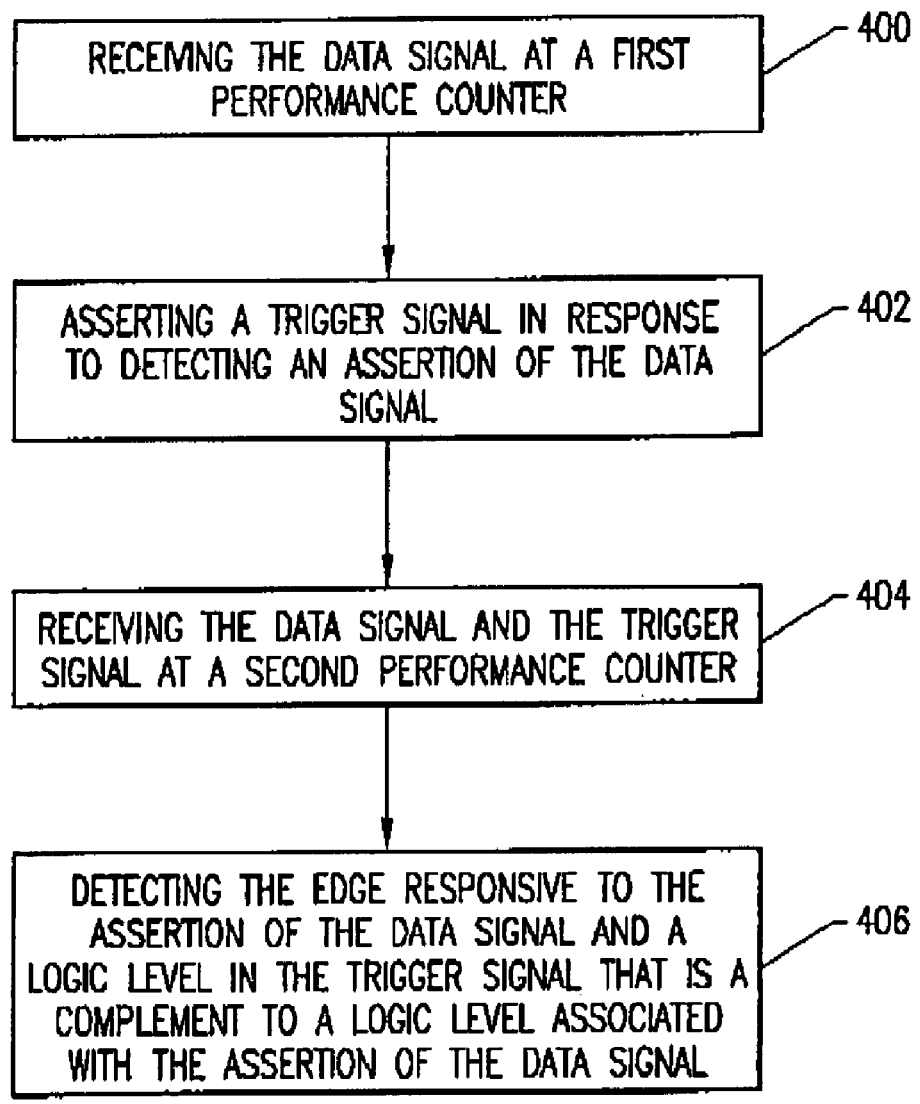
FIG. 4 depicts a flow chart of one embodiment of a method for detecting an edge of a data signal.

FIG. 4 depicts a flow chart of one embodiment of a method for detecting an edge of a data signal. At block 400, the data signal is received at a first performance counter. At block 402, a trigger signal is asserted in response to detecting an assertion of the data signal. In one implementation, the first performance counter is set to increment upon detecting an incoming asserted data signal. At block 404, the data signal and the trigger signal are received at a second performance counter. In one embodiment, the trigger signal is equivalent to the data signal delayed by one cycle and the second performance counter effectuates a comparator functionality. At block 406, at the second performance counter, the edge is detected based upon the sampled state of assertion of the data signal and a logic level in the trigger signal that is a complement to a logic level associated with the assertion of the signal.

An implementation of the invention described herein thus provides for a series of general purpose performance counters that may be utilized to detect rising and falling edges of a signal from of an observability bus. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown are implemented using CSRs, it will be appreciated that control signals may also be applied in a variety of other manners, including, for example, directly or may be applied via scan registers or Model Specific Registers ("MSRs"). Accordingly, all such modifications, extensions, variations, amendments, additions, deletions, combinations, and the like are deemed to be within the ambit of the present invention whose scope is defined solely by the claims set forth hereinbelow.

What is claimed is:

1. A system for counting occurrences of an edge of a data signal carried on an observability bus, the system comprising:
   a first performance counter connected to receive said data signal, said first performance counter being operable to assert a trigger signal in a given clock cycle in response to detecting an assertion of said data signal in the previous clock cycle; and
   a second performance counter connected to receive said data signal and said trigger signal, wherein said second performance counter counts an occurrence of said edge when said data signal is asserted and said trigger signal has a logic level that is a complement to a logic level associated with said assertion of said data signal.

2. The system as recited in claim 1, wherein said assertion of said data signal comprises an active high assertion.

3. The system as recited in claim 2, wherein said second performance counter inverts said trigger signal prior to detecting said logic level in said trigger signal.

4. The system as recited in claim 3, wherein said edge detected by said second performance counter comprises a rising edge.

5. The system as recited in claim 2, wherein said edge detected by said second performance counter comprises a falling edge.

6. The system as recited in claim 1, wherein the number of counted edges is employed in an average pulse width calculation.

7. The system as recited in claim 1, wherein said trigger signal comprises said data signal delayed by one cycle.

8. A method for counting occurrences of an edge of a data signal carried on an observability bus, the method comprising:
   receiving said data signal at a first performance counter;
   asserting a trigger signal in a given clock cycle in response to detecting an assertion of said data signal in the previous clock cycle;
   receiving said data signal and said trigger signal at a second performance counter; and
   counting an occurrence of said edge when said data signal is asserted and said trigger signal has a logic level that is a complement to a logic level associated with said assertion of said data signal.

9. The method as recited in claim 8, wherein said operation of asserting a trigger signal further comprises asserting said trigger signal in response to detecting an active high assertion in said data signal.

10. The method as recited in claim 9, further comprising inverting said trigger signal prior to detecting said edge.

11. The method as recited in claim 10, wherein said operation of detecting said edge further comprises detecting a rising edge.

12. The method as recited in claim 9, wherein said operation of detecting said edge further comprises detecting a falling edge.

13. The method as recited in claim 8, further comprising employing the number of counted edges in an average pulse width calculation.

14. A system for counting occurrences of an edge of a data signal carried on an observability bus, the system comprising:
   means for receiving said data signal at a first performance counter;
   means for asserting a trigger signal in a given clock cycle in response to detecting an assertion of said data signal in the previous clock cycle;
   means for receiving said data signal and said trigger signal at a second performance counter; and
   means for counting an occurrence of said edge when said data signal is asserted and said trigger signal has a logic level that is a complement to a logic level associated with said assertion of said data signal.

15. The system as recited in claim 14, wherein said means for asserting a trigger signal further comprises means for asserting said trigger signal in response to detecting an active high assertion in said data signal.

16. The system as recited in claim 15, further comprising means for inverting said trigger signal prior to detecting said edge.

17. The system as recited in claim 16, wherein said means for detecting said edge further comprises means for detecting a rising edge.

18. The system as recited in claim 15, wherein said means for detecting said edge further comprises means for detecting a falling edge.

19. The system as recited in claim 14, further comprising means for employing the number of counted edges in an average pulse width calculation.

* * * * *

UNITED STATES PATENT AND TRADEMARK OFFICE
CERTIFICATE OF CORRECTION

PATENT NO. : 7,432,742 B2  Page 1 of 1
APPLICATION NO. : 10/805979
DATED : October 7, 2008
INVENTOR(S) : Tyler J. Johnson It is certified that error appears in the above-identified patent and that said Letters Patent is hereby corrected as shown below:

In column 2, line 51, delete "Pr" and insert -- or --, therefor.

Signed and Sealed this

Tenth Day of March, 2009

JOHN DOLL
*Acting Director of the United States Patent and Trademark Office*